United States Patent
Letard

(10) Patent No.: US 11,845,096 B2
(45) Date of Patent: Dec. 19, 2023

(54) ROBOT, SYSTEM AND METHOD FOR ELECTROSTATIC POWDER COATING

(71) Applicant: Exel Industries, Epernay (FR)

(72) Inventor: François Letard, Paris (FR)

(73) Assignee: EXEL INDUSTRIES, Epernay (FR)

(*) Notice: Subject to any disclaimer, the term of this patent is extended or adjusted under 35 U.S.C. 154(b) by 2 days.

(21) Appl. No.: 17/548,534

(22) Filed: Dec. 12, 2021

(65) Prior Publication Data
US 2022/0193708 A1   Jun. 23, 2022

(30) Foreign Application Priority Data
Dec. 18, 2020 (FR) ........................... 2013708

(51) Int. Cl.
*B05B 13/04* (2006.01)
*B05B 5/025* (2006.01)
(Continued)

(52) U.S. Cl.
CPC .......... *B05B 13/0431* (2013.01); *B05B 5/025* (2013.01); *B05B 15/55* (2018.02);
(Continued)

(58) Field of Classification Search
CPC ..... B05B 13/0431; B05B 5/025; B05B 15/55; B05B 13/0447; B05B 16/90; B05B 5/087; B05B 14/41; B05B 14/48; B05B 5/032; B05B 7/0884; B05B 15/555; B05B 5/081; B05B 5/1683; B05B 7/1463; B05B 7/1472; B05B 14/10; B05B 15/50; B05D 1/06;
(Continued)

(56) References Cited

U.S. PATENT DOCUMENTS 5,743,958 A * 4/1998 Shutic .................... B05B 14/43
118/308
2006/0292308 A1* 12/2006 Clifford .............. B05B 13/0452
427/427.2
(Continued)

FOREIGN PATENT DOCUMENTS

DE  102012018940 A1   3/2014
EP    0789628 B1       1/1999
(Continued)

OTHER PUBLICATIONS

French Patent Application No. 2013708, INPI Rapport de Recherche Préliminaire, Sep. 8, 2021, 2 pages.

*Primary Examiner* — Alexander M Weddle
(74) *Attorney, Agent, or Firm* — Soquel Group LLC

(57) ABSTRACT

An electrostatic powdering robot for a powder booth, the robot including a projector for performing electrostatic powder coating. In order to reduce the time required for powder removal from the booth and facilitate automation of powder removal, the robot further includes a robotic arm, which is articulated and which carries the projector for positioning the projector, as well as a blower, for blowing a powder removal fluid, preferably air, the robotic arm carrying the blower to position the blower inside the booth, so that the blower blows the powder removal fluid onto a surface to be de-powdered inside the electrostatic powdering booth and thereby removes the residual powder coating the surface to be de-powdered.

12 Claims, 3 Drawing Sheets

(51) Int. Cl.
*B05B 15/55* (2018.01)
*B05D 1/06* (2006.01)
*B25J 11/00* (2006.01)
*B25J 15/00* (2006.01)

(52) U.S. Cl.
CPC ............ *B05D 1/06* (2013.01); *B25J 11/0075* (2013.01); *B25J 15/0019* (2013.01)

(58) Field of Classification Search
CPC .. B25J 11/0075; B25J 15/0019; B25J 9/0084; B25J 11/00; B25J 19/0058; B25J 21/00; B08B 5/02
See application file for complete search history.

(56) References Cited

U.S. PATENT DOCUMENTS

2018/0147591 A1* 5/2018 Krumma ............. B05B 13/0431
2018/0283016 A1* 10/2018 Telleria ............... E04F 21/1652

FOREIGN PATENT DOCUMENTS

| | | |
|---|---|---|
| EP | 727258 B1 | 10/1999 |
| EP | 1177052 B8 | 4/2006 |
| EP | 1930086 B1 | 1/2012 |
| EP | 3263228 A1 | 1/2018 |
| WO | 9612568 A1 | 5/1996 |
| WO | 2003009945 A1 | 2/2003 |
| WO | 2005068082 A5 | 7/2005 |
| WO | 2016188626 A2 | 12/2016 |
| WO | WO-2016188626 A2 * | 12/2016 ............ B05B 12/18 |
| WO | 2017033074 A1 | 3/2017 |

* cited by examiner

ROBOT, SYSTEM AND METHOD FOR ELECTROSTATIC POWDER COATING

CROSS-REFERENCE TO RELATED APPLICATION

This application claims priority of French Patent Application No. 20 13708, filed on Dec. 18, 2020.

FIELD OF THE INVENTION

The present invention relates to a robot for electrostatic powder coating, an electrostatic powder coating system including such a robot, and an electrostatic powder coating method that is carried out using such a robot or system.

BACKGROUND OF THE INVENTION

It is known of an electrostatic powder booth for applying a coating such as paint to an article by electrostatic powder coating said article inside the booth. The application of the powder to the article is accomplished by using electrostatic projectors, which emit a stream of powder, while the projectors and the article are raised to specific electrical potentials so that the powder is attracted to the article, to coat it. Once the article is electrostatically powder coated, it is transported to an oven. The oven heats the powder to a temperature so that a thermosetting material in the powder is reticulated, thereby attaching the coating to the article.

Despite the electrostatic effect, some of the powder emitted to powder the article does not reach the article and tends to deposit on the walls and floor of the booth, or even on the projectors themselves. In general, the booth is equipped with a residual powder suction system, making the inside of the booth a vacuum in order to recover most of this powder in order to recycle it and mix it with new powder for powdering subsequent articles. Nevertheless, despite this vacuum system, residual powder generally remains attached to the walls and floor, so that it is necessary to remove powder; i.e. clean the interior of the booth and the projectors, especially if one wishes to change the type of powder, for example for a change of color. When performed manually by an operator, this operation requires that the operation of the booth the be interrupted, for safety reasons.

WO96/12568A1 describes such a powder booth with powder projectors and an automatic cleaning unit. However, this automatic cleaning unit is particularly bulky and is only suitable for one booth shape. In addition, the cleaning unit has to be brought into the booth from the outside for each cleaning operation, which is time-consuming.

SUMMARY OF THE DESCRIPTION

The invention aims to remedy the disadvantages of the prior art by aiming to provide a new electrostatic powder coating robot, thanks to which the time required for powder removal from the booth is reduced and the automation of the powder removal is facilitated.

The invention relates to an electrostatic powder coating robot for an electrostatic powder coating booth, the electrostatic powder coating robot including a projector, which is configured to perform an electrostatic powdering. According to the invention, the electrostatic powdering robot further includes: a robotic arm that is articulated and carries the projector, to position the projector inside the electrostatic powder coating booth, so that the projector performs the electrostatic powder coating of an article inside the electrostatic powder coating booth; and a blower, which is configured to blow a powder removal fluid, preferably air, the robotic arm carrying the blower, to position the blower inside the electrostatic powder coating booth, so that the blower blows the powder removal fluid onto a surface to be de-powdered inside the electrostatic powder coating booth and thereby removes the residual powder coating from the surface to be de-powdered.

One idea behind the invention is to equip the projector and the blower on the same electrostatic powdering robot, so that the same robot is used to perform the electrostatic powdering and powder removal, i.e. cleaning of residual powder. The robotic arm positions, i.e. moves, directs and/or steers both the projector and the blower. Thus, when the article to be coated is present in the powder booth, the robotic arm positions the projector close to the article, while directing the projector towards the article to automatically perform the powdering. As soon as the article is powdered, the powder booth is ready for powder removal since the powder robot is permanently equipped with the blower. Then, the robot arm may immediately position the blower to have powder removed off the surface to be de-powdered, by directing the blower towards the surface to be de-powdered. The powder removal may be performed at any desired time, especially between powdering of two successive articles. Since the robotic arm positions the blower, the surface to be de-powdered may also be an interior wall of the booth, a floor of the booth, a ceiling of the booth, or the surface of another projector or robot positioned in the booth. This possibility of positioning the blower by the robotic arm makes powder removal particularly versatile, as any desired surface inside the booth may have powder removed by properly positioning the blower with the robotic arm. Just as the robot arm has been programmed for powdering by the projector, it may be programmed for powder removal by the blower. The powder removal is thus easily automated.

Preferably, the robotic arm includes a support head, carrying the projector and the blower, so that the projector and the blower are integrally moved by the robotic arm.

Preferably, the robotic arm is a poly-articulated arm, configured to position the projector and the blower in at least five degrees of freedom.

Preferably, the projector includes a first row of electrostatic projection heads; and the blower includes a row of blast nozzles, arranged parallel to the first row of electrostatic projection heads.

Preferably, the projector includes a second row of electrostatic projection heads, arranged parallel to the first row of electrostatic projection heads, the row of blowing nozzles being arranged between the first row and the second row of electrostatic projection heads.

Preferably, the projector includes a powdering electrode, the electrostatic powdering including raising the powdering electrode to a powdering electrical potential. Preferably, the electrostatic powdering robot further includes a powder removal electrode, independent of the powdering electrode, the powder removal electrode being configured to be raised to an anti-static electrical potential while the blower blows the powder removal fluid onto the surface that is to have powder removed.

The invention also relates to an electrostatic powdering system, including: the electrostatic powdering robot as defined above; and the electrostatic powder coating booth. The electrostatic powdering robot is arranged so that the robotic arm may position the projector inside the electrostatic powder coating booth, for the projector to perform the electrostatic powdering of the article inside the electrostatic powder coating booth, and the blower inside the electrostatic powder coating booth, for the blower to blow the powder removal fluid onto the surface to be de-powdered inside the electrostatic powder coating booth.

Preferably, the electrostatic powdering system further includes another robot, positioned inside the electrostatic powder coating booth. Preferably, the robotic arm is configured to position the blower so that the blower may blow the powder removal fluid onto the other robot to remove powder from the other robot.

Preferably, the powdering system further includes an auxiliary blower, which is positioned inside the electrostatic powder coating booth and which is configured to blow powder removal fluid. Preferably, the robotic arm is configured to position the projector proximate to the auxiliary blower, so that the auxiliary blower blows powder removal fluid onto the projector to remove powder from said projector.

Preferably, the blower is detachable from the robotic arm. Preferably, the electrostatic powder coating system includes a tool changing device designed to make the blower available to the robotic arm when the blower is detached from the robotic arm. Preferably, while the blower is detached from the robotic arm and made available to the robotic arm by the tool changing device, the robotic arm is adapted to automatically equip itself with the blower at the tool changing device, so as to carry the blower, in order to carry out the powder removal of the surface to be de-powdered.

The invention also has as its object an electrostatic coating method, implemented by means of the electrostatic powdering robot as defined above or the powdering system as defined above. The electrostatic powdering method includes: electrostatic powdering of the article by means of the projector, while the projector is positioned by the robotic arm inside the electrostatic powder coating booth, and, once the electrostatic powdering has been carried out, blowing powder removal fluid onto the surface to be de-powdered by means of the blower, while the blower is positioned by the robotic arm inside the electrostatic powder coating booth.

BRIEF DESCRIPTION OF THE DRAWINGS

The invention will be better understood and further advantages thereof will become apparent from the following description of examples according to its principle, illustrated in the appended drawings in which.

DETAILED DESCRIPTION

Figure 1:
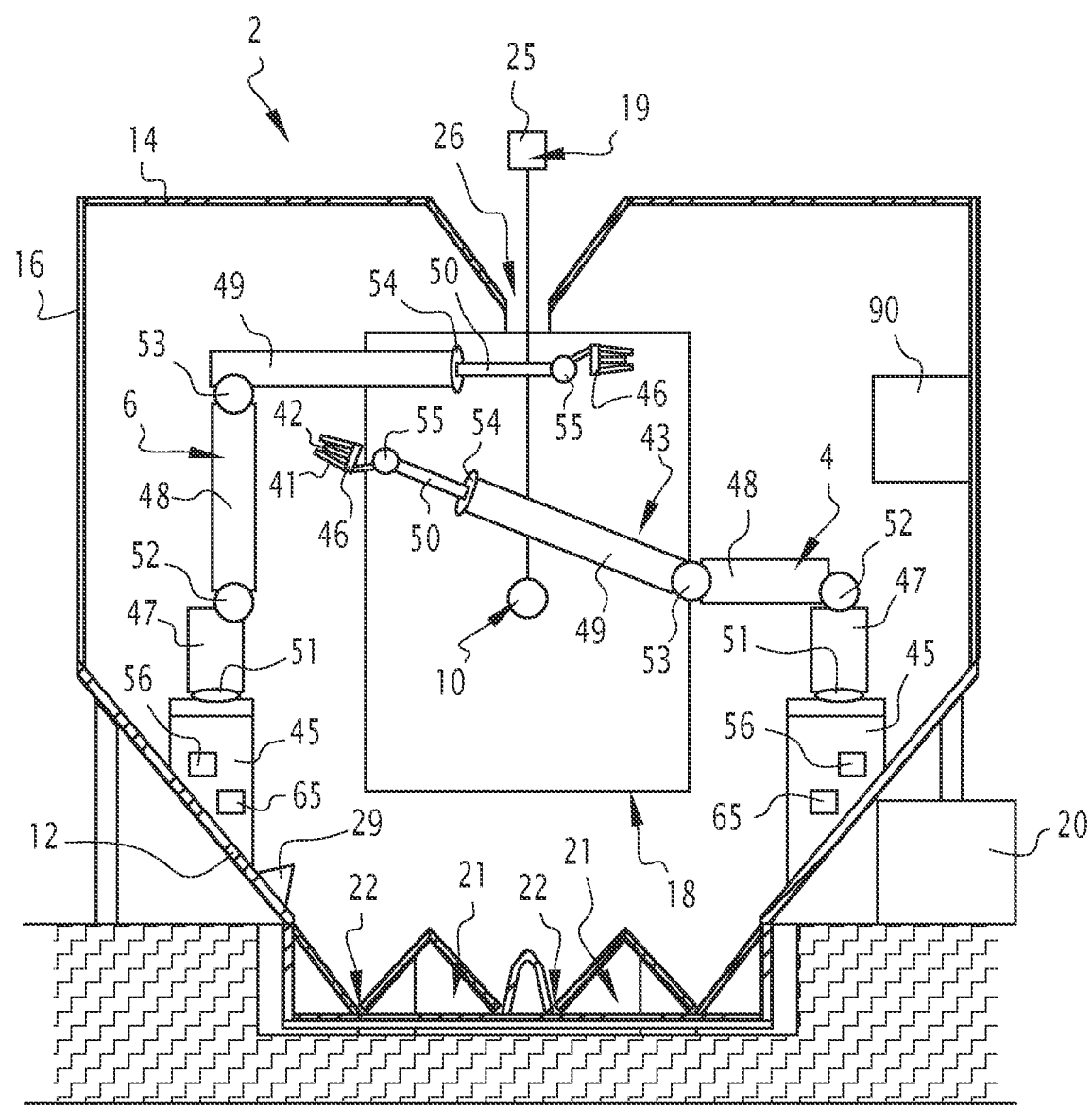
FIG. 1 is a schematic cross-sectional view of an electrostatic powdering system, according to one embodiment of the invention, including an electrostatic powdering robot.

FIG. 1 shows an electrostatic powdering system, which includes an electrostatic powder coating booth 2, an electrostatic powdering robot 4 and an electrostatic powdering robot 6.

Booth 2 is intended to house an electrostatic powdering operation of an article 10, while article 10 is positioned inside booth 2, with the powdering being performed using robots 4 and 6.

In the example shown in FIG. 1, booth 2 includes a floor 12, a roof 14 that extends above floor 12, and a peripheral wall 16 that connects floor 12 to roof 14 along their respective perimeters. Booth 2 defines a substantially enclosed powder compartment inside it, bounded by floor 12, roof 14 and peripheral wall 16, inside which powdering is performed. Booth 2 is essentially intended to trap inside it any residual powder that has not reached article 10 during the powder process.

The interior of booth 2, at least with respect to floor 12, roof 14 and peripheral wall 16, is preferably made of or lined with an electrically insulating material, such as a polymeric plastic material.

Booth 2 advantageously includes an access opening 18, which is provided through peripheral wall 16 in order to introduce article 10 into booth 2. Article 10 may be removed from booth 2 either through the same access opening 18 or through a second similar access opening, for example, provided opposite access opening 18 at the other end of booth 2.

The powdering system preferably includes a conveyor 19, for introducing article 10 into booth 2 through opening 18 and removing article 10 from booth 2 through opening 18 or another opening. Conveyor 19 includes a rail 25 from which article 10 is suspended, for example, the rail carrying a means for driving article 10 along the rail, such as a belt or chain. Rail 25 is advantageously arranged above roof 14, roof 14 advantageously providing a longitudinal notch 26 that follows the trajectory of rail 25 below rail 25. As article 10 passes through the interior of booth 2, article 10 is suspended from rail 25 through notch 26. Preferably, article 10 is moved by conveyor 19 without stopping inside booth 2, with the powdering of article 10 being performed while conveyor 19 continuously produces an advancing motion of article 10.

Preferably, conveyor 19 is designed to carry a plurality of articles in succession, distributed along rail 25, for successive powdering of these articles inside booth 2.

Advantageously, the powdering system includes a suction system, which is connected to booth 2 to suck up residual powder contained inside booth 2. For example, the suction system includes powder suction ducts 21 positioned under floor 12 as well as vents 22 provided through floor 12 to fluidly connect the interior of booth 2 to ducts 21, so that residual powder contained in booth 2 may be admitted into ducts 21 through vents 22. Preferably, as illustrated, floor 12 is formed by an assembly of inclined sections favoring a runoff of residual powder into vents 22.

The suction of residual powder advantageously puts the interior of booth 2 under negative pressure with respect to the exterior of booth 2, so that an air intake is carried out through any opening of booth 2, such as opening 18 and/or notch 26, which avoids any escape of residual powder from booth 2 through these openings.

To perform the suction, the suction system includes a powder suction pump 20 or any other suitable pumping means. Pump 20 is arranged outside booth 2 and connected to ducts 21 to suck residual powder out of booth 2 via ducts 21, through vents 22.

Preferably, all or part of the residual powder thus sucked in is then reintroduced into booth 2 for electrostatic powdering, possibly after treatment of this residual powder and/or after being mixed with fresh powder.

Article 10 is shown schematically in FIG. 1, and powder coating may be performed on any type of article, particularly a metal article, such as a bicycle frame, a body part or a piece of furniture.

The powder applied by electrostatic powdering in booth 2 onto article 10 is intended to form a coating on article 10. The electrostatic powder coating allows the powdering to be applied to article 10, to the desired parts of article 10, with the desired distribution. Then, outside booth 2, the powder is allowed to react in order to set the coating and give it its final characteristics, without prejudice to any subsequent treatments. In order to react the powder and thus fix the coating, article 10 is preferably subjected to a heat treatment, using an oven. The resulting coating is preferably a paint or a varnish coating article 10.

Preferably, the powder includes a thermosetting polymeric material. Once article 10 is powdered in booth 2, the heat treatment applied to article 10 causes the thermosetting material to harden; i.e., to cause reticulation, thereby setting the coating.

In the present example, robots 4 and 6 are identical, so the description of robot 4 applies to robot 6. In a variant, robot 6 is different from the robot 4. In a variant, it may be provided that the electrostatic powdering system includes a single electrostatic powdering robot, or a number of electrostatic powdering robots other than two. These robots may be identical or different from each other. In particular, it may be provided that robots 4 and 6 are different from each other, but both include a respective blower and projector, as described below, and a respective robotic arm, as described below, for positioning the blower and projector. In a variant, it may be provided that both robots 4 and 6 are powder robots, but only robot 4 includes a blower while robot 6 does not.

Here, robot 4 is entirely arranged inside booth 2. Robot 4 essentially includes a projector 41, a blower 42 and a robotic arm 43.

Robotic arm 43 carries projector 41 and blower 42, in order to position them inside booth 2; i.e., to move and orient them in the desired position inside booth 2. In other words, projector 41 and blower 42 may be positioned with the aid of arm 43, which serves as a mobile support for them. For this, arm 43 is articulated.

Preferably, robotic arm 43 is in the form of a polyarticulated arm; i.e. a multi-axis robot. Robotic arm 43 thus allows projector 41 and blower 42 to be positioned according to any desired configuration inside booth 2, in particular to adapt to the shape of booth 2 and article 10 by simple control and/or programming of robotic arm 43.

Robotic arm 43 includes a base 45 and a support head 46, as well as preferably a plurality of members connecting base 45 to head 46, in this case a member 47, a member 48, a member 49 and a member 50.

Robotic arm 43 is preferably received entirely inside booth 2. In a variant, a portion of arm 43 may be outside booth 2; e.g., base 45.

Robotic arm 43 is supported by base 45. For this, base 45 is advantageously fixed to booth 2, here to the floor of booth 2. Base 45 supports projector 41 and blower 42, via members 47, 48, 49 and 50 and head 46.

Member 47 is supported by base 45, being articulated in a motorized manner with respect to base 45, preferably by motorized articulation 51, pivoting here in a yaw. Member 47 supports members 49 and 50, head 46, projector 41 and blower 42 via member 48. Therefore, a movement of member 47 with respect to base 45 leads to an integral movement of members 48, 49 and 50, head 46, projector 41 and blower 42, with respect to booth 2.

Member 48 is supported by member 47, being articulated in a motorized manner with respect to member 47, preferably via a motorized joint 52, pivoting in pitch. Member 48 supports member 50, head 46, projector 41 and blower 42 via member 49. Therefore, a movement of member 48 with respect to member 47 leads to an integral movement of members 49 and 50, head 46, projector 41 and blower 42, with respect to member 47.

Member 49 is supported by member 48, being articulated in a motorized manner with respect to member 48, preferably via a motorized joint 53, pivoting in pitch. Member 49 supports head 46, projector 41 and blower 42, via member 50. Therefore, a movement of member 49 with respect to member 48 leads to integral movement of member 50, head 46, projector 41 and blower 42, with respect to member 48.

Member 50 is supported by member 49, being articulated in a motorized manner with respect to member 49, preferably via a motorized articulation 54, pivoting in roll. Member 50 supports projector 41 and blower 42, via head 46. Therefore, movement of member 50 with respect to member 49 leads to an integral movement of head 46, projector 41 and blower 42, with respect to member 49.

Head 46 is supported by member 50, by being articulated in a motorized manner with respect to member 50, preferably via a motorized articulation 55, pivoting in pitch. Head 46 supports projector 41 and blower 42. Therefore, movement of head 46 with respect to member 50 leads to an integral movement of projector 41 and blower 42, with respect to member 50.

Because of this structure, robotic arm 43 of the present example allows projector 41 and blower 42 to be positioned with five degrees of freedom relative to booth 2. The five degrees of freedom here include two translational degrees of freedom relative to booth 2, namely height and transverse positional variation, and two rotational degrees of freedom, namely pitch, roll and yaw. However, it may be provided that robotic arm 43 has a number of degrees of freedom other than five, in particular six degrees of freedom. Furthermore, it is preferred that the members of robotic arm 43 are arranged in series as in the illustrated example, with a given member being carried by a predecessor member in an articulated manner, and supporting a successor member in an articulated manner, with the first member being supported by base 45 in an articulated manner and the last member supporting head 46 in an articulated manner. Depending on the situation, a number of members other than four may be provided, preferably at least two members thus arranged, the first member being supported by the base in an articulated manner, and the second member being supported by the first member in an articulated manner, and supporting the head in an articulated manner.

Preferably, robot 4 includes an electronic unit 56 for controlling the positioning of projector 41 and blower 42 via robotic arm 43; e.g., in a pre-programmed manner and/or on manual control. For this purpose, electronic unit 56 controls robotic arm 43, in particular by controlling motorized joints 51, 52, 53, 54 and 55 to operate positioning of the members, on which the positioning of projector 41 and blower 42 depends. For example, electronic unit 56 includes an electronic controller, which is connected by a wire link to each joint to control it, and is connected by a wire link to a human/machine interface for programming and controlling the electronic controller by a person.

Figure 2:
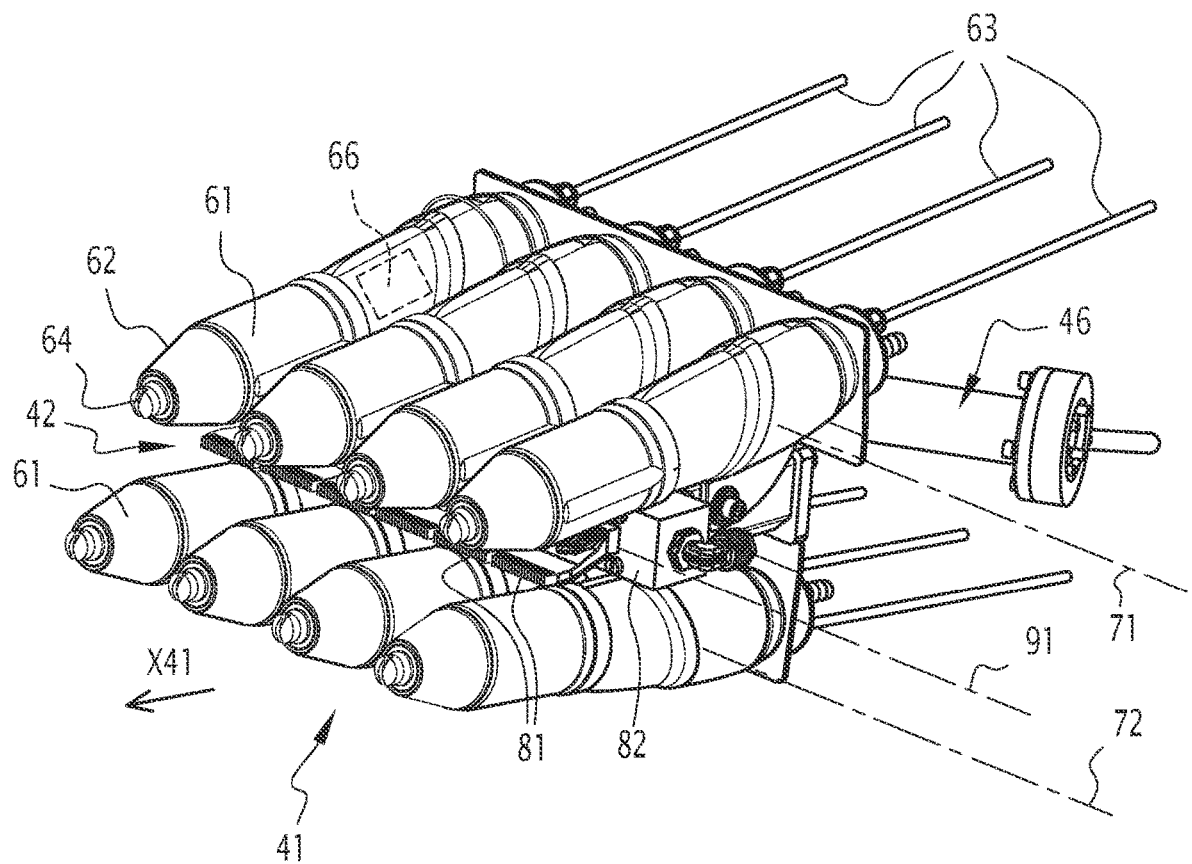
FIG. 2 is a perspective view of a portion of the electrostatic powdering robot of FIG. 1.
Figure 3:
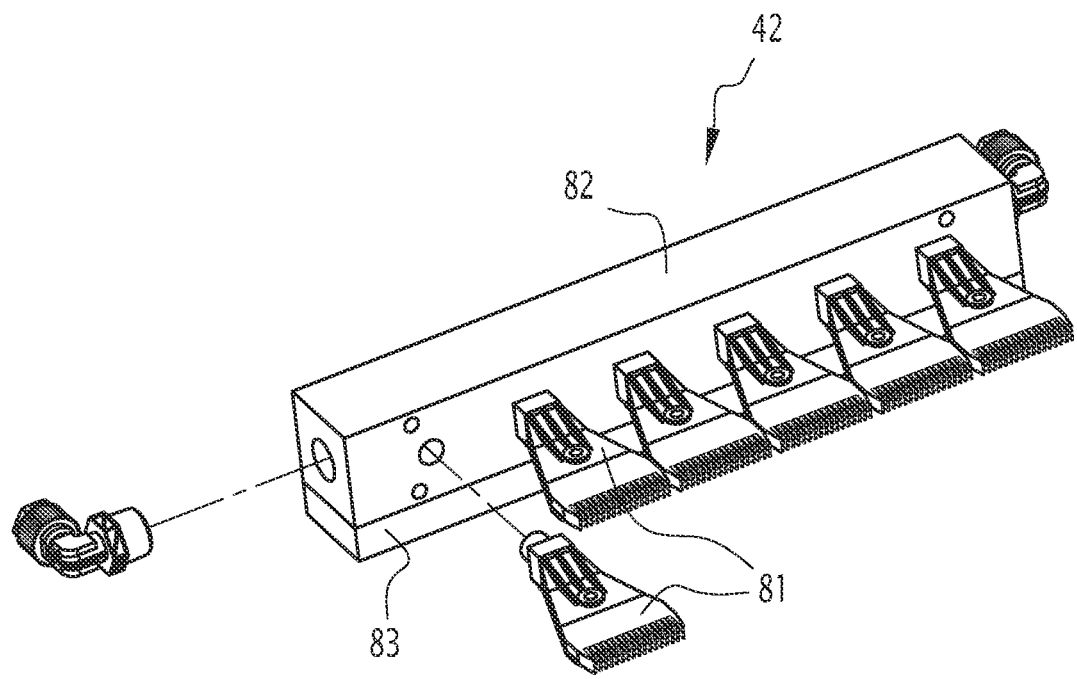
FIG. 3 is an exploded perspective view of a portion of the electrostatic powdering robot of FIGS. 1 and 2.

FIGS. 2 and 3 show a preferred embodiment of head 46, projector 41 and blower 42 in more detail. Blower 42 is shown alone in FIG. 3.

Projector 41 is configured to perform electrostatic powdering of article 10 by being positioned inside booth 2 by robotic arm 43 for this. While here, robot 4 is entirely inside booth 2, it is intended that at least projector 41 and blower 42 are inside booth 2, so that the emitted powder remains trapped inside booth 2.

Projector 41 includes eight projection heads 61. However, projector 41 may consist of a single projection head, or a number of projection heads other than eight.

Advantageously, each projection head 61 is in the form of an automatic gun, which is attached to support head 46 of robotic arm 43, so as to be immobile relative to support head 46.

Each projection head 61 incorporates a flat, round or vortex spray nozzle 62 to emit a spray of powder of the desired shape towards article 10. All heads 61 may be chosen to have an identical nozzle 62, or for the nozzles equipping the heads to be different, to produce jets of different characteristics.

Preferably, the respective nozzle 62 of each projection head 61 is individually supplied with powder by means of a respective supply line 63, connected to the rear of the respective projection head 61, for example. Preferably, powder may be selectively sprayed via only selected heads 61. Preferably, the powder is conducted to nozzle 62 via line 63 under action of a powder pump, which is itself supplied with fresh powder from a fresh powder supply, and/or with recycled powder, from the residual powder recovered by the aforementioned suction system.

As an alternative to nozzle 62, each head 61 may be provided with a rotating bowl.

Advantageously, it may be provided that the powder fed to each head 61 is different from the powders fed to the other heads, such as a powder of different color or a powder intended to form a varnish while another powder is intended to form a paint or a primer.

In a variant, it can be provided that all or several projection heads 61 are fed with the same powder and/or work together.

Each projection head 61 also incorporates a high voltage unit 66, shown schematically by transparency for a single head 61 in FIG. 2, energizing an electrode 64 of projection head 61. Electrode 64 is brought to an electrical potential called "powdering electrical potential" by high-voltage unit 66. The powdering potential is a high-voltage potential, preferably continuous. When electrode 64 is brought to the powdering electrical potential, it applies this powdering electrical potential directly to the powder in the powder jet, or in the vicinity of the powder jet to obtain a corona effect. For example, the electrode 64 is formed at the end of head 61, or is in the form of multiple electrodes around the head.

To generate an electrostatic field that tends to stick the powder from the powder jet to article 10, it is preferably provided that article 10 is grounded and the powdering electrical potential is a negative DC potential, such as −80 kV (kilovolts). More generally, it is preferred that the powdering electrical potential is between −70 kV and −90 kV. "Continuous" means that the powdering potential applied by electrode 64 does not change sign. In a variant, depending on the application, the type of powder and the type of article, it may be provided that the powdering potential has a positive sign, for example at +70 kV. Preferably, article 10 is grounded via conveyor 19, which is itself grounded. More generally, a high-voltage potential difference is provided between electrode 64 and article 10, where the powdering potential at which electrode 64 is carried, is far removed from, and in particular far below, the potential at which article 10 is carried.

For electrostatic powdering, all heads 61 may be actuated at the same time. In a variant, it may be possible to activate certain heads 61 selectively, particularly if heads 61 emit different powders and/or jets of different characteristics, or if it is desired to change the powder on a head 61 while powder is being carried out by other heads 61.

In the present example, as shown in FIG. 2, heads 61 are arranged in two parallel rows 71 and 72. Here, both rows 71 and 72 have the same number of heads 61. For each row 71 and 72, heads 61 are arranged at regular intervals, for example. Preferably, each head 61 in row 71 is arranged opposite one of heads 61 in row 71. Thus, heads 61 may also be considered to be arranged in pairs, each pair including one head 61 in row 71 and one head in row 72. For each pair, the two heads 61 are arranged in a column that is perpendicular to rows 71 and 72, for example.

Preferably, heads 61 are fixed relative to support head 46 during use of projector 41 and its positioning by robotic arm 43. Projector 41 is designed to perform electrostatic powdering of article 10, while article 10 is positioned in a predetermined area in front of projector 41. In other words, projector 41 is to be positioned pointing in the direction of article 10, and inside a predetermined distance range from article 10. This range may depend on which head(s) 61 are performing the electrostatic powdering at the time. In the present example, all heads 61 are oriented along the same direction X41, which is fixed with respect to support head 46, or at least along a direction that approaches direction X41. For example, for each pair of heads 61, the two heads are oriented along converging directions, which are concurrent with direction X41.

In summary, performing electrostatic powdering of article 10 implies that, while projector 41 is positioned inside booth 2 so as to aim at article 10, while being at a predetermined distance from article 10, projector 41 emits a powder jet and applies the high voltage potential difference between projector 41 and article 10. In particular, this condition is fulfilled when one of heads 61 emits the powder jet while generating the high-voltage potential difference, while the head is correctly positioned relative to article 10. During electrostatic powdering, projector 41 may be static or mobile, under the action of robotic arm 43, so as to coat article 10 with powder.

Electrostatic powdering of article 10 is advantageously performed jointly by robots 4 and 6, using their respective projectors, each robot performing the electrostatic powdering of an opposite side of article 10, or of mutually remote parts of article 10, for example.

Blower 42 is configured to blow air toward a surface to be de-powdered inside booth 2, being positioned in booth 2 for this by robotic arm 43. The air may be emitted in one or more jets, preferably in a flat jet, in a continuous or pulsed manner. The purpose of this air blowing is to remove, i.e., to detach, the residual powder coating the surface to be de-powdered, this residual powder having been deposited accidentally during electrostatic powdering. The act of removing the residual powder puts it in suspension inside booth 2, thus promoting its suction by the aforementioned suction system. Preferably, the suction system is activated during and/or after the powder removal performed by blower 42.

It is advantageous that blower 42 blows air rather than another fluid, because the same compressed air generator may supply both projector 41 for powder spraying and blower 42 for powder removal. Since air is a gas that does not mix with the residual powder, the residual powder is not contaminated and may be more easily reused for further electrostatic powdering. However, it may be provided that blower 42 blows or sprays any other suitable powder removal fluid, such as another gas or even a liquid.

Any surface inside booth 2 may be a surface to be de-powdered, as long as robotic arm 43 may position blower 42 to remove powder from that surface. In particular, the surface to be de-powdered may be all or part of floor 12, wall 16, and roof 14. The surface to be de-powdered may be a portion of conveyor 19 that is positioned inside booth 2.

Advantageously, it is envisaged that blower 42 of robot 4 performs powder removal of all or part of robot 6, which then constitutes the surface to be de-powdered. In particular, robot 4 may carry out powder removal of projector 41 or blower 42 of robot 6. Conversely, robot 6 may perform powder removal of robot 4, if robot 6 is equipped with a blower 42. More generally, robot 4 may be responsible for powder removal of any robot or equipment contained in booth 2, whether it is a powdering robot or a robot with another function, such as handling articles 10, or another automatic device such as a jack or wiring contained in booth 2.

In a variant, article 10 may be provided as a surface to be de-powdered, for example, if an incorrect powdering has been performed on article 10, if excess powder needs to be removed from article 10, or to achieve a particular surface finish for article 10.

Blower 42 shown in detail in FIGS. 2 and 3 includes six blowing nozzles 81. However, blower 42 may consist of a single blowing nozzle 81, or a different number of nozzles 81 than six.

Each nozzle 81 is attached to support head 46 of robotic arm 43, so as to be immovable relative to support head 46. Thus, nozzles 81 are preferably stationary relative to projection heads 61. More generally, the fact that projector 41 and blower 42 are carried on a single support head 46 means that they are moved at the same time by robotic arm 43; i.e., integrally, as mentioned above. Preferably, projector 41 and blower 42 are provided to be stationary with respect to head 46 during electrostatic powdering and during powder removal.

Nozzles 81 are supplied with powder removal fluid, in this case air, by a supply manifold 82, which distributes a single stream of powder removal fluid to all nozzles 81 at the same time. In other words, the supply of fluid to manifold 82 results in a simultaneous emission of fluid from all nozzles 81. Preferably, nozzles 81 are attached to support head 46 via manifold 82, which is itself attached to head 46.

Blowing nozzles 81 are arranged in a row 91, which is parallel to rows 71 and 72 of projection heads 61, between rows 71 and 72.

Each blowing nozzle 81 is advantageously in the form of a flat jet nozzle, which is particularly effective for removing the residual powder. Advantageously, each nozzle 81 is oriented so that the flat jet is directed along direction X41, parallel to row 91 and to direction X41. In this situation, the combination of the flat jets from nozzles 81 form a flat stream of powder removal fluid; i.e., a planar curtain of powder removal fluid, which is directed along direction X41 parallel to row 91. This is particularly effective in stripping residual powder from the surface to have powder removed.

In a variant, it may be provided that all or some of the blowing nozzles emit a jet of different shape, for example a round jet.

Preferably, projector 41 and blower 42 are directed along the same direction X41, which facilitates programming of robotic arm 43 for positioning heads 61 and nozzles 81, the powder and powder removal fluid flows being emitted in the same direction.

Preferably, powder removal is performed while access opening 18 is closed to avoid dispersing residual powder outside booth 2. Preferably, powder removal is performed when no electrostatic powdering is being performed in booth 2. Preferably, powder removal is performed when no article to be powdered or already powdered is contained in booth 2 in order to avoid accidentally polluting the surface of this article with detached residual powder. In other words, first an electrostatic powdering of one or more articles 10 is performed with projector 41. Then, once powdering is done, blowing is performed with blower 42. Then, further powdering of other articles may be performed.

Advantageously, since blower 42 is always arranged in booth 2, blowing is carried out automatically between powdering of two successive articles. For example, it may be foreseen that powder removal is systematically and automatically carried out when two successive articles 10 are sufficiently spaced along conveyor 19, or if the supply of booth 2 with articles is temporarily interrupted. Powder removal may be performed with one robot at a time, or with multiple robots at the same time.

Optionally, blower 42 may include an electrode 83, referred to as a "powder removal electrode", which is independent of any powder electrode that may be carried by projector 41. Electrode 83 may be in the form of a single electrode or multiple electrodes. Here, electrode 83 belongs to a deionizing bar, sometimes referred to as an "ionizing bar" or "active antistatic bar," which is, for example, integral with manifold 82, or otherwise integrated with blower 42. In a variant, electrode 83 may be carried by another part of robot 4, or even be arranged elsewhere in booth 2.

The purpose of electrode 83 is to improve the efficiency of powder removal of the surface to be de-powdered, especially if it is floor 12, wall 16 or roof 14. To this end, electrode 83 is raised to an electrical potential known as the "powdering removal electrical potential", which is intended to de-ionize the powder removal fluid, the air in the vicinity of the surface to be de-powdered, the surface to be de-powdered and/or the residual powder lifted during blowing. This avoids the residual powder tendency to stick back to the surface to be de-powdered or to another surface, by electrostatic effect. For this purpose, the powder removal potential is preferably an alternating high voltage potential, or at least a high voltage potential whose value changes sign. For example, the alternating high-voltage potential is expected to be 10 kV. More generally, it may be foreseen that the potential is at least 7 kV. Advantageously, it is envisaged that electrode 83 is brought to the de-welding potential by a high-voltage unit belonging to blower 42, or a high-voltage unit carried elsewhere on the robot, or even external. The high-voltage unit is integrated into the deionizing bar. In any case, the high-voltage unit for electrode 83 is preferably separate from high-voltage unit 66.

In addition or in a variant, it may be foreseen that blower 42 itself is equipped with one or more electrodes, brought to high voltage during the blowing, in order to favor detachment of residual powder.

In summary, carrying out the blowing of the surface to be de-powdered implies that, while blower 42 is positioned inside booth 2 so as to aim at the surface to be de-powdered, while being at a predetermined distance from the surface to be de-powdered, blower 42 emits a jet of powder removal fluid. During blowing, blower 42 may be static or mobile, under action of robotic arm 43, so as to effectively de-powder the surface to be de-powdered.

Preferably, robot 4 includes an electronic unit 65, to control operation of projector 41 and blower 42; i.e. to control the supply and/or release of powder and fluids; e.g., in a pre-programmed manner and/or on manual control. For this purpose, electronic unit 65 controls in particular projection heads 61 and blowing nozzles 81 and/or manifold 82;

e.g., by means of a set of solenoid valves. For example, unit 65 includes an electronic controller, which is connected by a wire link to heads 61, nozzles 81 and/or manifold 82, or other parts of a powder and fluid network that feeds them, and is connected by a wire link to a human-machine interface for programming and controlling the electronic controller by a person.

As shown in FIG. 1, it is advantageously provided that the powdering system includes an auxiliary blower 29, distinct from blowers 42 equipping robots 4 and 6. Auxiliary blower 29 is preferably fixed, being carried by floor 12, wall 16 or roof 14 of booth 2, e.g., on the inside. Like blower 42, auxiliary blower 29 is provided for blowing powder removal fluid, preferably air. For example, auxiliary blower 29 is identical to blower 42. Auxiliary blower 29 is used for powder removal of robot 4, especially its projector 41, which can hardly have powder removed by its own blower 42. To carry out powder removal of robot 4, it is advantageously provided that its robotic arm 43 positions projector 41, or any other surface to be de-powdered by robot 4, in the vicinity of auxiliary blower 29, in particular in the path of the emitted powder removal fluid flow. Thus, powder removal by robot 4 is operated by auxiliary blower 29, in particular projector 41. Powder removal by robot 6 may be operated in a similar way for any other robot equipping booth 2, especially robot 6. Presence of blower 29 is particularly advantageous if booth 2 includes a single robot such as robot 4, or if booth 2 includes several robots of which only one is equipped with a blower 42.

Above, a case is described where projector 41 and blower 42 are permanently attached to the robot arm. However, it may in a variant be provided that parts of the blower, or even the whole blower, and/or parts of the projector, or even the whole projector, are actually detachable from the robotic arm, preferably automatically.

In particular, it may be envisaged that the powdering system includes a tool changing device 90, shown very schematically in FIG. 1, placed, for example, in booth 2. Device 90 makes one or more spare tools available to the robot or robots. Device 90 is, for example, in the form of a rack, with a respective slot for each spare tool, or a slot serving alternately for several spare tools.

In particular, robotic arm 43 has access to device 90 to automatically equip and de-equip projector 41 and/or blower 42, depending on the operation to be performed. In this case, projector 41 and/or blower 42 are presented as spare tools that may be selectively equipped on robotic arm 43. For example, during electrostatic powdering, only projector 41 is carried by robotic arm 43 while blower 42 is detached from robotic arm 43, being carried by device 90, awaiting further use. In order to perform powder removal, robotic arm 43 automatically equips itself with blower 42 at device 90, so as to carry blower 42. To attach blower 42, it may advantageously be provided that robotic arm 43 has previously detached projector 41 by depositing it in device 90. In order to perform electrostatic powdering, robotic arm 43 automatically equips itself with projector 41 at device 90, so as to carry projector 41. To equip projector 41, it may advantageously be provided that robotic arm 43 has previously detached blower 42 by depositing it in device 90.

Any feature from one embodiment or variant described above may be implemented in any other embodiment or variant described above, as far as technically possible.

The invention claimed is:

1. An electrostatic powdering robot for an electrostatic powder coating booth, comprising:
   a projector configured to perform electrostatic powdering;
   a robotic arm, which is articulated and carries said projector to position said projector inside the electrostatic powder coating booth, so that said projector performs electrostatic powdering of an article inside the electrostatic powder coating booth; and
   a blower configured to blow a powder removal fluid, said robotic arm carrying said blower to position said blower inside the electrostatic powder coating booth, so that said blower blows the powder removal fluid onto a surface to be de-powdered, inside the electrostatic powder coating booth, and thereby removes residual coating powder from the surface to be de-powdered.

2. The electrostatic powdering robot according to claim 1, wherein said robotic arm comprises a support head, carrying said projector and said blower, so that said projector and said blower are jointly moved by said robotic arm.

3. The electrostatic powdering robot according to claim 1, wherein said robotic arm is a poly-articulated arm, configured to position said projector and said blower with at least five degrees of freedom.

4. The electrostatic powdering robot according to claim 1, wherein:
   said projector comprises a first row of electrostatic projection heads; and
   said blower comprises a row of blowing nozzles, arranged parallel to said first row of electrostatic projection heads.

5. The electrostatic powdering robot according to claim 4, wherein said projector comprises a second row of electrostatic projection heads, arranged parallel to said first row of electrostatic projection heads, said row of blowing nozzles being arranged between said first row and said second row of electrostatic projection heads.

6. The electrostatic powdering robot according to claim 1, wherein said projector comprises a powdering electrode, the electrostatic powdering comprising raising said powdering electrode to a powdering electrical potential, and wherein the electrostatic powdering robot further comprises a powder removal electrode, independent of said powdering electrode, the powder removal electrode configured to be raised to an anti-static electrical potential while said blower blows the powder removal fluid onto the surface to be de-powdered.

7. The electrostatic powdering robot according to claim 1, wherein the powder removal fluid is air.

8. An electrostatic powdering system, comprising:
   an electrostatic powdering robot according to claim 1; and
   an electrostatic powder coating booth arranged so that the robotic arm of said electrostatic powdering robot can position:
      the projector of said electrostatic powdering robot inside said electrostatic powder coating booth, so that the projector performs the electrostatic powdering of an article inside said electrostatic powder coating booth; and
      the blower of said electrostatic powdering robot inside the electrostatic powder coating booth, for the blower to blow powder removal fluid onto a surface to be de-powdered inside said electrostatic powder coating booth.

9. The electrostatic powdering system according to claim 8, further comprising a second robot according to claim 1, arranged inside said electrostatic powder coating booth, and wherein the robotic arm of said electrostatic powdering robot is configured to position the blower of said electrostatic powdering robot so that the blower can blow the powder removal fluid onto said second robot, in order to remove powder from said second robot.

10. The electrostatic powdering system according to claim 8, further comprising an auxiliary blower, which is positioned inside said electrostatic powder coating booth and is configured to blow powder removal fluid, wherein the robotic arm is configured to position the projector in proximity to said auxiliary blower, so that said auxiliary blower blows powder removal fluid onto the projector to remove powder from the projector.

11. The electrostatic powdering system according to claim 8, wherein the blower is detachable from the robotic arm, the system further comprising a rack, including respective slots for spare tools including the blower, and adapted to make the blower available to the robotic arm when the blower is detached from the robotic arm, and wherein while the blower is detached from the robotic arm and made available to the robotic arm by said rack, the robotic arm is adapted to automatically equip itself with the blower at said rack so as to carry the blower in order to execute powder removal of the surface to be de-powdered.

12. An electrostatic powdering method, carried out by means of the electrostatic powdering robot according to claim 1, comprising:
 electrostatically powdering an article by the projector of the electrostatic powdering robot, while the projector is positioned by the robotic arm of the electrostatic powdering robot inside an electrostatic powder coating booth; and
 once said electrostatically powdering has been carried out, blowing, by the blower of the electrostatic powdering robot, powder removal fluid onto a surface to be de-powdered, while the blower is positioned by the robotic arm inside the electrostatic powder coating booth, for removing residual coating powder from the surface to be de-powdered.

\* \* \* \* \*